(No Model.)
P. MILLET.
WAGON END GATE.
No. 479,076. Patented July 19, 1892.
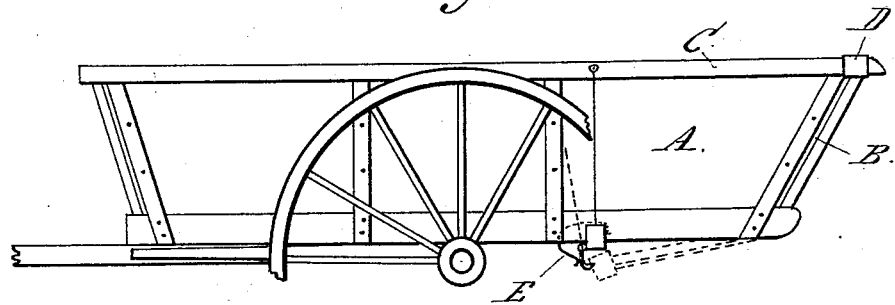
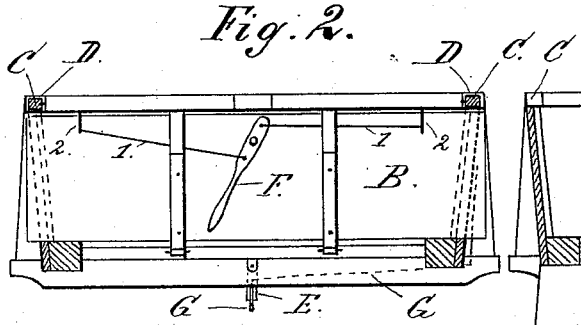
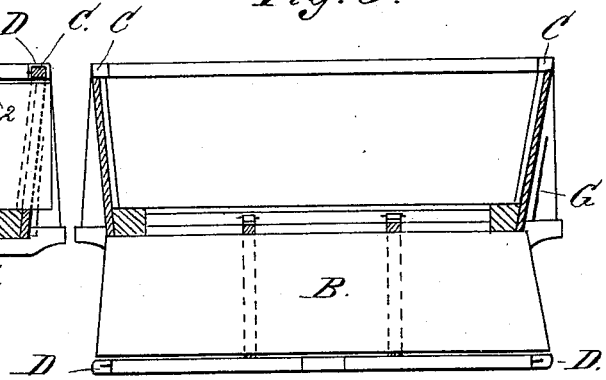
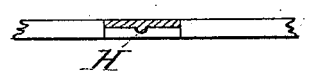
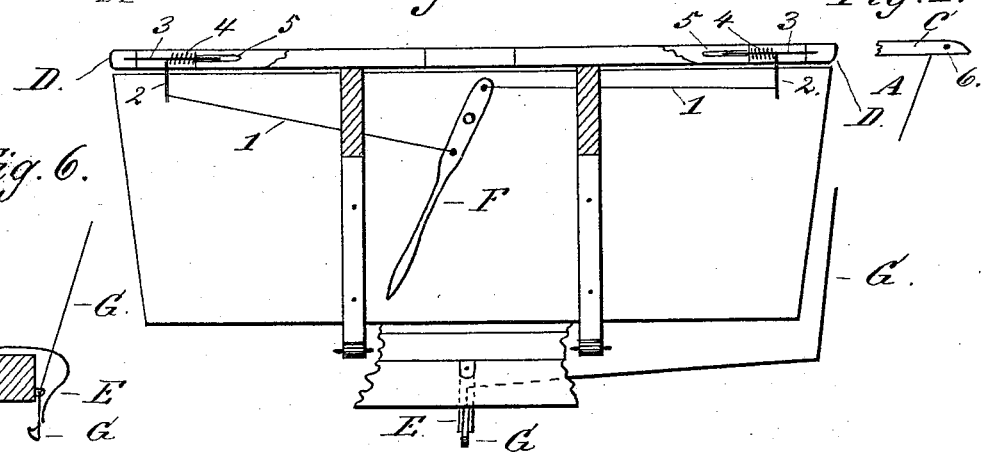
WITNESSES
INVENTOR
Pierre Millet
by W. E. Stringfellow
Attorney

UNITED STATES PATENT OFFICE.

PIERRE MILLET, OF BONNET CARRE, LOUISIANA, ASSIGNOR OF TWO-THIRDS TO ERNEST MILLET AND ALBERT MILLET, OF SAME PLACE.

WAGON END-GATE.

SPECIFICATION forming part of Letters Patent No. 479,076, dated July 19, 1892.

Application filed January 7, 1892. Serial No. 417,295. (No model.)

*To all whom it may concern:*

Be it known that I, PIERRE MILLET, a citizen of the United States, residing at Bonnet Carre, in the parish of St. John Baptist and State of Louisiana, have invented certain new and useful Improvements in Tail-Gates for Carts and Wagons; and I do declare the following to be a full, clear, and exact description of the invention, such as will enable others skilled in the art to which it appertains to make and use the same.

My invention relates to an improvement in a tail-gate for wagons and carts, and its novelty will be fully understood from the following description and claim when taken in connection with the annexed drawings; and the objects of my invention are to enable a tail-gate to be readily opened and fastened by means of a lever and connecting-rods and at the same time enable a tail-gate to be held in position by a spring-catch under body of cart until released by a lever on side of cart, thus facilitating the loading and unloading of a wagon or cart. I attain these objects by the mechanism illustrated in the accompanying drawings, in which—

Figure 1 is a sectional side view. Fig. 2 is sectional rear view. Fig. 3 is a sectional rear view showing tail-gate open. Fig. 4 is a sectional top view of rail of tail-gate for engaging spring-catch. Fig. 5 is a sectional rear view showing lever and springs. Fig. 6 is a sectional side view showing spring under cart-body. Fig. 7 is a sectional view of side rear piece, showing opening for fastening-rod.

Similar letters and figures refer to similar parts throughout the several views.

In the drawings, A shows side of cart-body; B, tail-gate having its top cross-arm provided with metal rods, as shown by 3 in Fig. 5. Said rods 3 are provided with downwardly-projecting arms 2, which are rigidly attached to rods 3, the arms 2 having wires 1 attached to same and are connected to lever F, which is pivoted to tail-gate by suitable means. The rods 3 are provided with spiral springs 4 and regulate the movement of rods in slot 5 and openings 6 in side end pieces C. Placed on ends of top cross-arm of tail-gate are metal rectangular-shaped clasps D, such as are ordinarily placed on tail-gates of wagons and carts, these clasps D having openings in side of same, which permits an easy working back and forth of rods 3. Attached to cross-arm under body of cart I place a spring-catch, and so adjusted that as tail-gate is swung on incline under end of wagon or cart, as shown by dotted lines in Fig. 1, the spring-catch retains the tail-gate until spring-catch is released by means of lever G.

In practice the tail-gate is placed in position in the usual manner, the lever F being compressed slightly to the right with the hand, which will enable rods 3 to be drawn back in slot 5, and when pressure is released the springs 4 throw rods into openings 6 of side end pieces C, and in this manner a fastening is made. Should it be desired to release the tail-gate, simply move the lever F to the right by means of the hand and the rods 3 are withdrawn from the openings 6, and the tail-gate can be lowered, as shown in Fig. 3, until top cross-arm rests on catch-spring E at a point designated by H, and is held in this position until released by pressure placed on lever G.

A striking advantage of my invention is its economical construction, easy manner in which the same is operated, and saving of time and labor in placing tail-gate on wagons and carts.

Having described my invention and the manner in which the same is or may be carried into effect, I would say in conclusion that I do not limit myself to the precise details herein shown in illustration, as the same may be varied to some extent; but

What I claim, and desire to secure by Letters Patent, is—

The combination, with the wagon-body having the side rails extended rearwardly and provided with the apertures, of the end-gate having the angular clasps D to embrace said extended ends, the slidable rods 3 3, having springs 4 and arms 2, the lever F, pivoted on the end-gate, the rods 1 1, connecting said lever on opposite sides of its pivoted point with the arms 2, the spring-catch E, arranged beneath the body, and the latch-lever G, all adapted to operate substantially as specified.

In testimony whereof I affix my signature in presence of two witnesses.

PIERRE MILLET.

Witnesses:
ALPHONSE J. CUNEO,
PERCY D. PARKS.